US009639068B2

(12) United States Patent
Leinen et al.

(10) Patent No.: US 9,639,068 B2
(45) Date of Patent: May 2, 2017

(54) DISTRIBUTED CONTROL SYSTEM OPERATION AND CONFIGURATION (75) Inventors: Richard A. Leinen, Wilsonville, OR (US); David E. Burgess, Beaverton, OR (US); Scott Alexander Anderson, Tualatin, OR (US); Kevin Parsons, Wilsonville, OR (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 678 days.

(21) Appl. No.: 13/812,717

(22) PCT Filed: Jul. 30, 2010

(86) PCT No.: PCT/US2010/044001
§ 371 (c)(1),
(2), (4) Date: Mar. 25, 2013

(87) PCT Pub. No.: WO2012/015437
PCT Pub. Date: Feb. 2, 2012

(65) Prior Publication Data
US 2013/0211548 A1    Aug. 15, 2013

(51) Int. Cl.
G05B 11/01    (2006.01)
G05B 15/02    (2006.01)
G05B 19/414   (2006.01)

(52) U.S. Cl.
CPC .............. *G05B 11/01* (2013.01); *G05B 15/02* (2013.01); *G05B 19/4148* (2013.01)

(58) Field of Classification Search
CPC  G05B 19/042; G05B 19/0423; G05B 19/054; G05B 19/0426; G05B 15/02
See application file for complete search history.

(56) References Cited

U.S. PATENT DOCUMENTS

| 4,204,201 | A | 5/1980 | Williams et al. |
|---|---|---|---|
| 4,562,550 | A | 12/1985 | Beatty et al. |
| 5,777,869 | A | 7/1998 | Welch |
| 6,587,739 | B1 * | 7/2003 | Abrams ................ G05B 15/02 340/12.32 |
| 7,257,523 | B1 | 8/2007 | Nixon et al. |
| 7,652,395 | B2 | 1/2010 | Von Arx et al. |
| 7,821,160 | B1 | 10/2010 | Roosli et al. |
| 8,264,195 | B2 | 9/2012 | Takehara et al. |
| 2002/0023188 | A1 | 2/2002 | Heidel et al. |
| 2002/0152298 | A1 * | 10/2002 | Kikta et al. .................. 709/223 |
| 2004/0010680 | A1 | 1/2004 | Smith |
| 2004/0122930 | A1 * | 6/2004 | Pasternak .......... H04L 12/2602 709/223 |

(Continued)

FOREIGN PATENT DOCUMENTS

EP     1199637     4/2002

*Primary Examiner* — Robert Fennema
*Assistant Examiner* — Jigneshkumar Patel
(74) *Attorney, Agent, or Firm* — Marger Johnson (57) ABSTRACT A control system including an input component configured to receive an input and generate control information in response to the input; a communication link coupled to the input component; and a plurality of control components, each of the control components coupled to the input component through the communication link and configured to receive the control information and to actuate an associated actuator in response to the control information.

15 Claims, 6 Drawing Sheets

(56) References Cited

U.S. PATENT DOCUMENTS

| | | |
|---|---|---|
| 2004/0268186 A1 | 12/2004 | Maturana et al. |
| 2005/0085928 A1 | 4/2005 | Shani |
| 2005/0119770 A1 | 6/2005 | Park et al. |
| 2006/0010497 A1 | 1/2006 | O'Brien et al. |
| 2006/0132065 A1* | 6/2006 | Sears ................. H05B 37/0254 315/312 |
| 2006/0284734 A1 | 12/2006 | Newman, Jr. |
| 2007/0038337 A1 | 2/2007 | Hofmann et al. |
| 2007/0282547 A1 | 12/2007 | Howell et al. |
| 2008/0015714 A1 | 1/2008 | Rudnick et al. |
| 2008/0188963 A1 | 8/2008 | McCoy |
| 2009/0096623 A1 | 4/2009 | Roosli |
| 2009/0195349 A1 | 8/2009 | Frader-Thompson et al. |
| 2010/0114451 A1 | 5/2010 | Fujii et al. |
| 2010/0141153 A1* | 6/2010 | Recker et al. ................. 315/149 |
| 2010/0191388 A1* | 7/2010 | Huizenga ............... H01H 47/24 700/296 |
| 2011/0015797 A1* | 1/2011 | Gilstrap ................. G05B 15/02 700/291 |
| 2011/0301725 A1* | 12/2011 | Kline, Jr. ........................ 700/90 |
| 2012/0030496 A1 | 2/2012 | Chandhoke et al. |
| 2013/0131837 A1 | 5/2013 | Washington et al. |

* cited by examiner

DISTRIBUTED CONTROL SYSTEM OPERATION AND CONFIGURATION

CROSS-REFERENCE TO RELATED APPLICATION

This application claims benefit of International Application No. PCT/US2010/044001, titled "DISTRIBUTED CONTROL SYSTEM OPERATION AND CONFIGURATION," filed Jul. 30, 2010, which is incorporated by reference herein in its entirety.

BACKGROUND

This disclosure relates to control system operation and configuration, and in particular, to operation and configuration of a distributed control system.

Control systems, such as a lighting control system, typically have a central controller. Signals from switches, occupancy sensors, photocells, or the like are input into the central controller. The central controller processes the inputs and generates signals to control electrical loads, such as lighting circuits, HVAC system components, or the like. Because of such centralization, a single point of failure is created. In addition, as control systems increase in size, the central controller creates a bottleneck for control signals.

DETAILED DESCRIPTION

Figure 1:
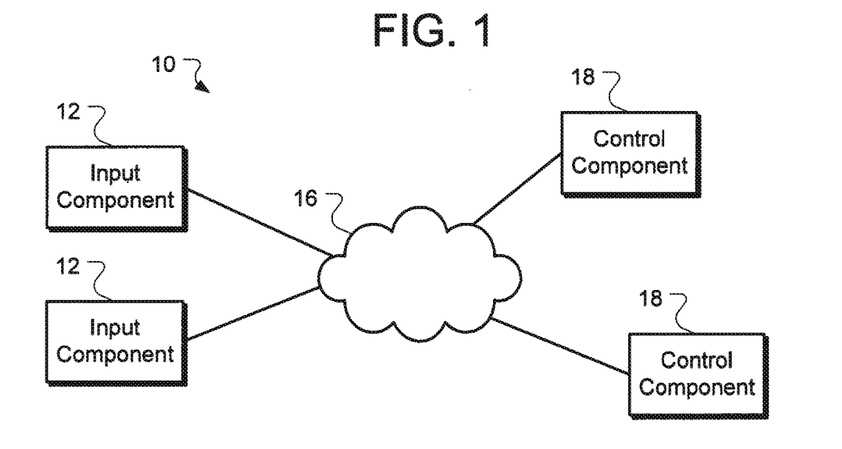
FIG. 1 illustrates an embodiment of a control system according to some inventive principles of this patent disclosure.

FIG. 1 illustrates an embodiment of a control system according to some inventive principles of this patent disclosure. In this embodiment, the control system includes input components 12, and control components 18. The input components 12, and control components 18 are coupled together through a communication link 16.

An input component 12 can be any device or system that can provide control information in response to an input. For example, in the context of a lighting control system, an input component can include an occupancy sensor, a switch, a photocell, a time clock, or the like. Other systems that may or may not be part of a lighting control system can be an input component 12. For example, an input component 12 can include a thermostat, an accelerometer, keyboard, touch screen, computer, processor, or the like.

An input associated with an input component can be any stimuli appropriate to the input component 12. For example, an input for the switch can be a movement of the switch, as press of a button, a movement of a slider, a combination of such inputs, or the like. In another example, for a photocell, an input can be a sensed amount of light. In yet another example, for a thermostat, an input can be a sensed temperature. Regardless of the source or medium, the input can be used to generate control information by the input component 12.

Control information can be information related to the control of one or more aspect of the control system 10. For example, the control information can include a command to actuate an actuator of a control component 18. Control information can include astronomical information, such as time, day, month, sunrise, sunset, high/low tide, a combination of such information, or the like. In another example, the control information can include a status of an input, such as a state of a switch, sensed parameters, or the like.

The communication link 16 can include a variety of communication system that can provide for communication between multiple devices. For example, a communication link can include a wireless or wired network. The communication link can include networks such as a controller area network (CAN), an Ethernet network, any other multi-node network, a combination of such networks, or the like.

A control component 18 can include any device or system that is capable of affecting an aspect of the control system 10. Examples of control components 18 include relays, ballasts, circuit breakers, displays, user interfaces, combinations of such components, or the like.

A control component 18 can be coupled to the input components 12 through the communication link 16. Through the communication link 16, a control component 18 can be configured to receive the control information from one or more of the input components 12. In response to the control information, the control component 18 is configured to actuate an actuator.

In particular, a control component 18 can be configured to receive the control information that an input component 12 transmitted. That is, in an embodiment, a control component 18 is responsive to the actual control information transmitted by an input component 12. Accordingly, a central controller is not needed to process the information from an input component 12. Each of the control components 18 can be configured to individually determine how to respond in response to the control information.

Although a response to control information has been described in the context of a single control component 18, any number of control components 18 can receive and respond to the control information from a single input component 12. For example, as will be described in further detail below, the control information can be transmitted over the communication link 16 in such a way that each control component 18 can receive the control information. Such transmissions can include broadcast messages, multi-cast messages, or the like.

The control information can be information that is included in a payload of a message from an input component 12. The control information can be appropriately routed, encapsulated, transmitted over a variety of network types, or the like during transmission from the input component 12 to a control component 18. However, the control information can remain substantially the same.

Although multiple control components 18 have been described as responding to control information from an input component 12, all of the control components 18 need not respond to the same input component 12. That is, a first set of one or more control components 18 can be configured to respond to control information from a first input component 12 while a second set of one or more control components 18 can be configured to respond to control information from a second input component 12.

Furthermore, a single control component 18 can be configured to respond to control information from any input component 12, regardless of whether any other control component 18 responds to the same control information. That is, each control component 18 can be configured to respond to a unique set of one or more input components 12. Moreover, each control component 18 can be configured to respond differently to the same control information. As a result, each control component 18 can have a unique response to the same input components 12, control information, or the like.

Figure 2:
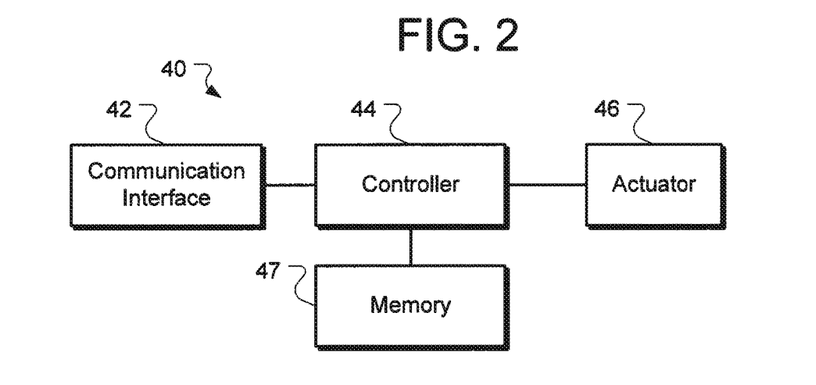
FIG. 2 illustrates an embodiment of a control system component according to some inventive principles of this patent disclosure.

FIG. 2 illustrates an embodiment of a control system component according to some inventive principles of this patent disclosure. The control component 40 includes a communication interface 42 coupled to a controller 44. The controller 44 is coupled to an actuator 46.

An actuator 46 can be any device suitable to perform an action in the control system. For example, an actuator 46 can include a relay, a solenoid, a motor, a speaker, a light, a hydraulic cylinder, a combination of such devices or similar devices, or the like. Actuating the actuator 46 can include any actuation appropriate to the actuator 46. For example, actuating can include opening or closing contacts of a relay, changing a position of a solenoid, advancing or reversing a motor, emitting a sound from a speaker, a combination of such actions, or the like.

Although a control component 40 has been illustrated with a single actuator 46, a control component 40 can have any number of actuators 46, whether the same, similar, or different. For example, a single control component 40 can have a relay and a solenoid. The relay can be actuated in response to a first set of control information while the solenoid can be actuated in response to a different, second set of control information. Moreover, the different actuators can be actuated in response to the same control information. For example, control information indicating a requested light level of 50% can cause a relay to be closed and cause dimming circuitry to be set to the 50% level.

The controller 44 can be any variety of circuitry. For example, the controller 44 can include analog and digital circuitry. The controller 44 can include general purpose processors, digital signal processors, application specific integrated circuits, programmable gate arrays, a combination of such devices, or the like. The controller 44 can also include appropriate circuitry to interface with the actuator 46, the communication interface 42, or other associated circuitry.

The memory 47 can be any variety of data storage devices. For example, the memory 47 can include static or dynamic memories, volatile or non-volatile memories, mass storage devices, a combination of such memories, or the like. The memory 47 can be configured to store a configuration for the control component 40.

The communication interface 42 can be any variety of interface appropriate to a communication link 16 described above. For example, the communication interface can include an Ethernet port, a wireless transceiver, a serial port, a combination of such interfaces, or the like. Moreover, the functionality of the communication interface 42 can be wholly or partially integrated with the controller 44. For example, the controller can include an integrated Ethernet port that only uses an external transformer or isolator.

Although a control component 18 and an input component 12 have been described differently, one or more control components 18 and one or more input components 12 can be integrated together. For example, a switch and a relay can be combined in a single component. However, the relay, or more generally, the control component portion can be configured to respond not only to the associated switch, but also to other control information received through the communication interface 42.

Figure 3:
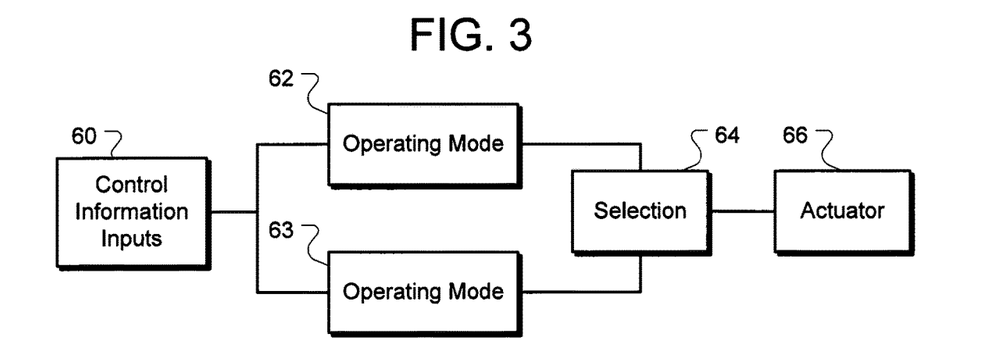
FIG. 3 illustrates an embodiment of an operation of a control system component according to some inventive principles of this patent disclosure.

FIG. 3 illustrates an embodiment of an operation of a control system component according to some inventive principles of this patent disclosure. As described above, a control component 18 can receive various control information from various sources. Control information inputs 60 represents this control information. The control component 18 can operate according to multiple operating modes, such as operating modes 62 and 63. Although, two operating modes have been illustrated, the control component 18 can be configured to operate according to any number of operating modes.

An operating mode is a configuration determining how the control component 18 operates. That is, the operating mode can establish what control information is used, how it is combined, what actuators are controlled, or the like. For example, the control information inputs 60 can represent a photocell output and an occupancy sensor output from corresponding input components 12. Operating mode 62 can represent a combination of the photocell and an automatic-on response to the occupancy sensor. For example, the photocell output can override the occupancy sensor's signal when there is sufficient ambient light; however, the occupancy sensor can automatically turn on a light when there is not sufficient ambient light. Operating mode 63 can represent a manual-on response to the occupancy sensor. For example, the occupancy sensor may be used to maintain a light in an on state, but may not be used to turn on the light. In other words, the operating modes 62 and 63 can take the same control information inputs 60 and produce different responses.

Accordingly, the control components 18 can each be configured individually as to how to respond. A central controller is not necessary to operate the control components 18. That is, the logic determining how to respond to various inputs represented by the control information is distributed across the control components 18 of the control system 10.

A selected operating mode is represented by selection 64. Although the selection 64 is illustrated as receiving outputs from each operating mode 62 and 63, the processing or operation according to the operating modes of the control component 18 may or may not be performed substantially simultaneously. That is, if one operating mode is selected, then only the processing associated with that operating mode may be performed. Regardless, the selected operating mode is used to actuate the actuator 66 in response to the control information inputs 60.

The selection 64 can be made in response to a variety of conditions. For example, a signal can be broadcast on the communication link 16 that indicates a current time. The operating modes 62 and 63 can each be associated with a different time period, start time, or the like. Accordingly, when such a signal is received the operating mode that is associated with the current time can be selected. Using the example described above, an automatic-on operating mode 62 can be active during business hours of 8 am to 5 pm while a manual-on operating mode 63 can be active between 5 pm and 8 am. Thus, if a current time signal indicates that the 5 pm threshold has been crossed, the selected operating mode can be changed from operating mode 62 to operating mode 63.

In an embodiment, such a current time signal can be generated from a single source. That is, the source can, but need not, be at a central location. However, the operation of a control component 18 is still defined at the individual control components 18. That is, the current time signal is not a specific control for any actuator 66. In contrast, the responses to the current time signal are defined by the individual control components 18 and the corresponding operating modes.

In an embodiment, a schedule change signal can be used to select from among operating modes. The current time described above is one example of such a schedule change signal. In another example, a master component of the control system can make a determination of whether operating modes should change. For example, the master component can maintain a clock, calendar, or the like. When a transition to a different state on the schedule occurs, the component can be configured to broadcast that change as a schedule change signal. That is, the schedule change signal can, but need not, include any indication of the time. For example, the schedule change signal can indicate that an office with the control system 10 is closed. The schedule change signal communicates the closed state. In response, the control components 18 can be configured to change operating modes to the appropriate mode for the closed office.

In particular, the schedule change signal that can change operating modes of control components 18 of the control system 10 can be a single schedule change signal. For example, the schedule change signal need not be tailored for any particular control component 18. Thus, the same signal can be transmitted to all control components 18. The control components 18 can each select an operating mode, maintain a current operating mode, or the like in response to the schedule change signal.

In an embodiment, a schedule change signal can, but need not, affect every component of the control system 10. For example, components can be grouped according to various techniques. Outdoor components, indoor common area components, indoor private area components, or any other grouping can be used. Different schedules, schedule change signals, or the like can be used for these groups. For example, outdoor components may operate on a schedule that does not distinguish weekdays from weekends. Thus, operating modes of components such as exterior security lighting can change based on a time of day; however, the operating modes can maintain a consistent response regardless of the date. In contrast, interior components may change operating modes on the weekends, nights, or the like. Furthermore, such different schedules can, but need not, be present between similar components. For example, a first conference room may be more heavily used that a second conference room. Schedules for the conference rooms can be different to reflect the different usage.

Although multiple operating modes have been described above, in an embodiment, control components 18 can be configured with only one operating mode. However, as there are multiple control components 18, and each can determine its operation in response to various control information, the logic behind the functionality can still be distributed across the control system 10.

In an embodiment, a control component 18 can be configured to communicate a status back to the input components 12. For example, a switch as an input component 12 can be configured to send control information with a turn-on signal to control components 18, such as a relay. In one example, the switch turn-on signal is received by the relay and, in response, the relay closes. The relay can then transmit a message back to the switching indicating the updated, closed state. The switch can then respond accordingly, for example, by turning on a visual indicator indicating that a corresponding light should be on. However, in another example, the relay may receive the same turn-on signal from the switch; however, control information from another input component 12 may override the turn-on signal. In this example, a photocell signal may override a switch turn-on signal. The relay can still respond, but can respond with a status indicating that the relay did not change state. If an input component 12 does not receive a status, the input component 12 can be configured to retransmit the control information.

As described above, a change can be made from one operating mode to another. In an embodiment, the change in operating modes can include a transition through a third operating mode. That is, the third operating mode can define how control information is used during the transition. For example, in a first operating mode, a first type of control information, such as information from an occupancy sensor, may have priority over another type of control information, such as a photocell. However, the second operating mode may not have such a priority. If an immediate transition is made, the state of the control components 18 may enter an undefined state, an unstable state, induce an undesired actuation, or the like. The transition operating mode can be used to alleviate such effects.

Figure 4:
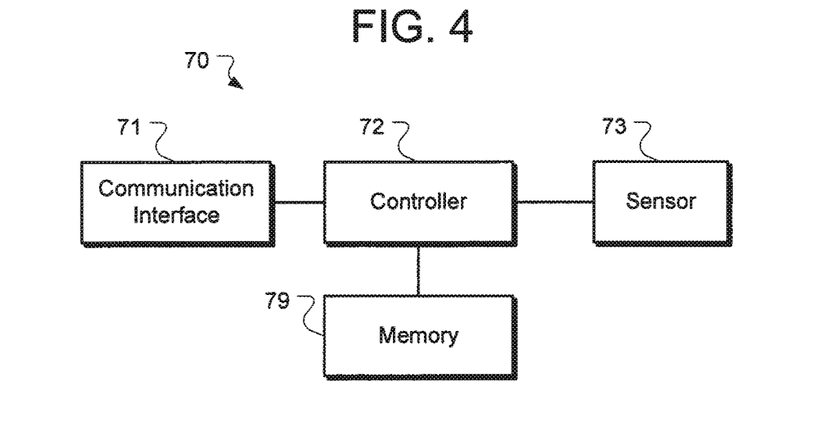
FIG. 4 illustrates another embodiment of a control system component according to some inventive principles of this patent disclosure.

FIG. 4 illustrates another embodiment of a control system component according to some inventive principles of this patent disclosure. In this embodiment, the control system component is an input component 70. The input component 70 includes a communication interface 71, controller 72, and memory 79 similar to the communication interface 42, controller 44, and memory 47 of FIG. 2. However, the input component 70 can include a sensor 73.

The sensor 73 can be any variety of sensor for the control system 10. For example, the sensor 73 can be one or more switches, buttons, touch pads, or the like. The sensor 73 can be a temperature sensor, a light sensor, an infrared sensor, a sonic sensor, a combination of such sensors, or the like. Any sensor 73 that can be configured to sense stimuli of interest to the control system 10 can be used.

Although a single sensor 73 has been illustrated, any number of sensors 73 can be included in an input component 70. For example, an infrared sensor and an ultrasonic sensor can be included in an occupancy sensor as the input component 70. In another example, an infrared sensor and a switch can be included in the input component 70.

Figure 5:
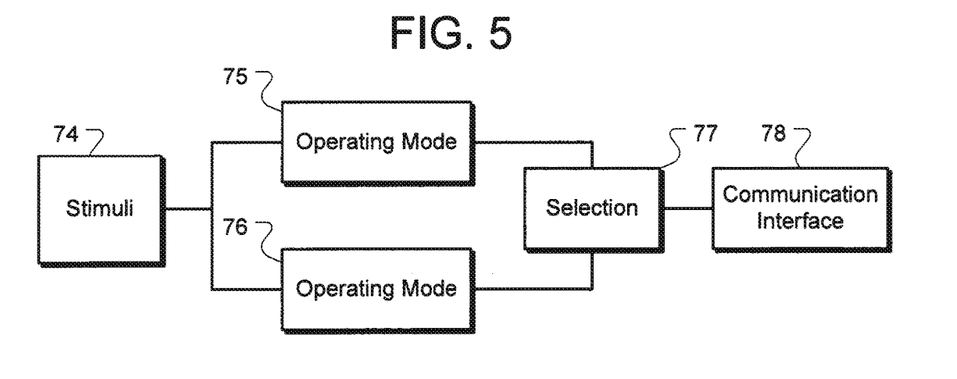
FIG. 5 illustrates another embodiment of an operation of a control system component according to some inventive principles of this patent disclosure.

FIG. 5 illustrates another embodiment of an operation of a control system component according to some inventive principles of this patent disclosure. Referring to FIGS. 4 and 5, an input component 70 can be configured to generate control information in response to stimuli sensed by the sensors 73. Stimuli 74 can represents such sensed signals.

Similar to the control component 40 described above, an input component 70 can have multiple operating modes such as operating modes 75 and 76. The stimuli 74 can be inputs to the operating modes 75 and 76. A selection 77 of the operating modes can be made in response to the various signals described above. Resulting control information according to a selected operating mode can be transmitted over the communication interface 78.

For example, an input component 70 can include a photocell. Operating mode 75 can represent operating-hours for a business. In this case, the photocell may be configured to transmit control information, such as an off-signal, dependent on ambient light levels so that when sufficient light is present, other lights can be turned off. Operating mode 75 can represent an after-hours time for a business. Accordingly, the photocell may be disabled, or configured to not transmit control information based on ambient light. Thus, at night, after closing, lights will not be turned on. In another example, for an occupancy sensor, operating mode 75 can represent an automatic-on mode while operating mode 76 can represent a manual-on mode.

Just as control components 40 can switch between operating modes in response to various signals, input components 70 can switch between operating modes. For example, in response to a schedule change signal, a current time, a single signal, or the like as described above, the operating modes for not only a single control system component can be changed, but for any number, including every control system component. That is, with as little as a single message, the entire operation of the control system 10 can change.

In addition, as described above, the input component 70 can also transition between operating modes, such as by using a third, transition operating mode. For example, for a photocell, if in one operating mode 75, the photocell can be configured to transmit control information indicating a turn-off signal for relays. However, if immediately, transitioned to operating mode 76, the photocell may transmit control information relinquishing the control of the relays. In response, the relays may change state unexpectedly. The transition operating mode can cause the photocell to not transmit such a message as it enters the operating mode 76. Thus, a chance of an undefined, unstable, or undesired state can be alleviated.

Figure 6:
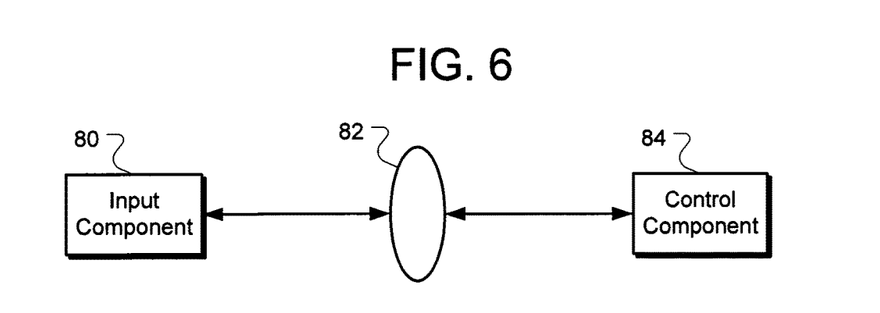
FIGS. 6-9 illustrate embodiments of communication between control system components according to some inventive principles of this patent disclosure.

FIGS. 6-9 illustrate embodiments of communication between control system components according to some inventive principles of this patent disclosure. Referring to FIG. 6, an input component 80 can communicate with a control component 84. The communication can include an identification. The identification can be independent of an identification of the input component 80 and the control component 84 on the communication link represented by the connection between the input component 80 and the control component 84.

For example, the input component 80 and the control component 84 can each have an associated address for communication on the communication link. However, the identification represented by 82 is associated with both the input component 80 and the control component 84. That is, the input component 80 can be configured to transmit a message using the identification 82 without reference to an identification of the control component 84 on the communication link. The input component 80 can similarly receive messages with the identification 82. That is, the input component 80 can be configured to communicate using the identification 82. Similarly, the control component can be configured to communicate using the identification 82.

Figure 7:
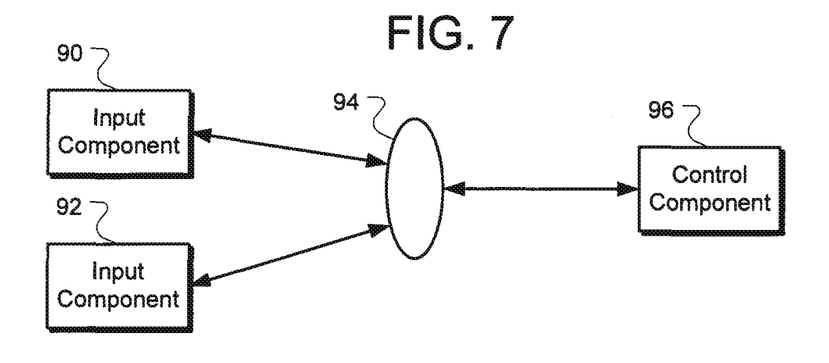

Referring to FIG. 7, multiple input components 90 and 92 can transmit and receive using the same identification 94. However, that identification 94 can be associated with a single control component 96. Thus, to communicate, the input components 90 and 92 and the control component 96 each use the identification 94.

Figure 8:
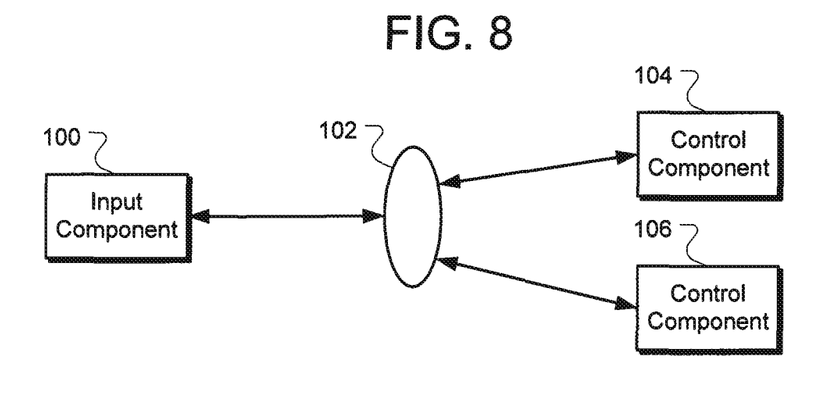

Similarly, referring to FIG. 8, an input component 100 can communicate with multiple control components 104 and 106 using identification 102. That is, a single message using identification 102 can be transmitted. Each of the control components 104 and 106 can respond to messages including that identification 102. Furthermore, when either of the control components 104 and 106 reply to a communication, as described above, the reply can include the identification 102. Although a single input component 100 is illustrated, multiple input components can be associated with the identification 102 similar to FIG. 7. That is, any number of input component and control components can communicate using any given identification.

Control components and input components can be associated with multiple identifications. For example, a control component can also be configured to respond to an identification that only references that control component and can be configured to respond to another, different identification that references multiple control components.

For example, an individual identification can represent one lighting circuit, such as a 20 amp circuit controlled by a relay. Other relays within a panel can control other 20 amp circuits, each with their own individual identification. A group identification can represent all of the relays. Each relay can be configured to respond to communications including both the group identification and the corresponding individual identification. However, each relay need not respond in the same way. For example, in response to a turn-on message from a switch, some relays of the group may close while others open. Since the operating modes are distributed in the control components 18, the responsiveness of the control components 18 depends on the particular configuration of the operating modes.

As a result, configuring a control system 10 can be accomplished with less configuration. For example, if an additional lighting circuit is added to a room, a relay that controls that lighting circuit can be configured to respond to an identification of an existing group of relays. Thus, when a switch communicates using that identification, the newly added relay can respond without having to reconfigure the input components to control the new relay. Similarly, a new input component can be added and can be configured to communicate using the same identification. For example, a new switch can be added, which can then control the associated relays using the group identification. The switch can, but does not need to be configured with identifications of the individual relays.

Figure 9:
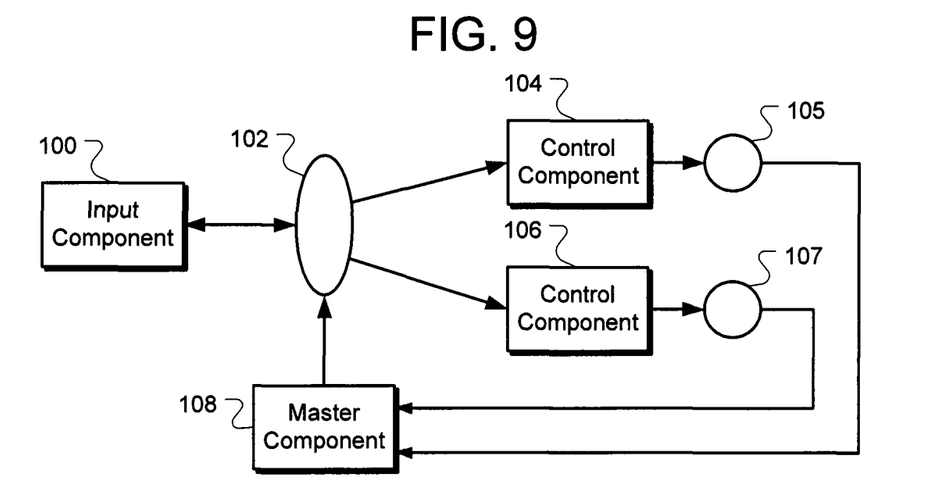

FIG. 9 illustrates an embodiment of indirect communication between control system components according to some inventive principles of this patent disclosure. As described with respect to FIG. 8, one or more input components 100 can communicate to control components 104 and 106 using a group identification 102. However, the control components 104 and 106 can be configured to communicate using individual identifications 105 and 107, respectively.

A master component 108 can be configured to aggregate the responses from the control components 104 and 106. The aggregated response can be transmitted to the input component 100. For example, the input component 100 can be unaware of the control components 104 and 106 associated with the group identification 102. That is, the input component 100 may only be configured with the group identification 102. Accordingly, if a status message is receive from the control component 104 with its status, the input component 100 may not know whether the entire group has responded to some control information transmitted using the group identifier 102. The master component 108 can aggregate the individual responses into a status associated with the group identifier 102 that can be transmitted to the input component 100. Accordingly, an input component 100 or other input components associated with the group identifier 102 need not maintain information related to the control components associated with the group identifier 102.

Figure 10:
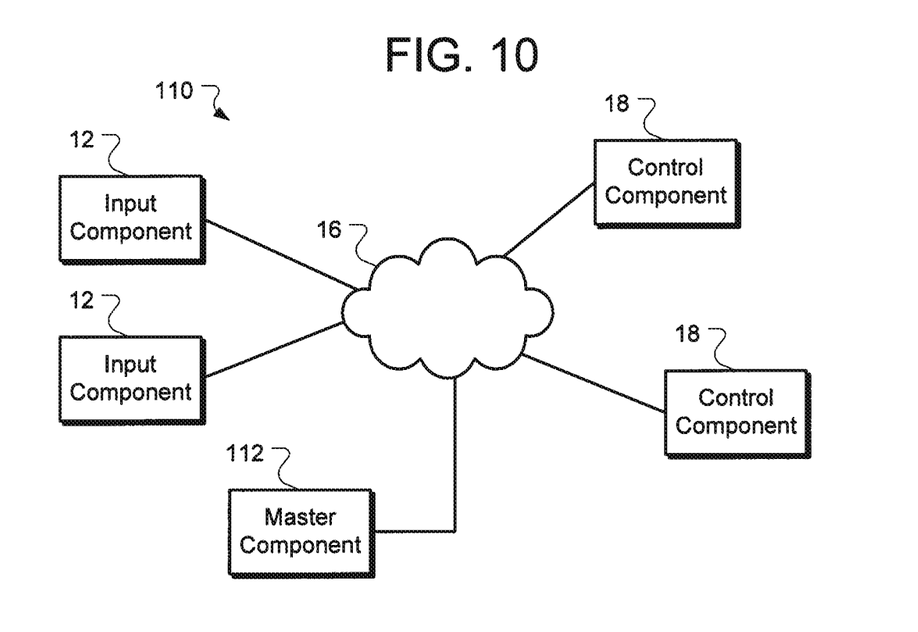
FIG. 10 illustrates an embodiment of a control system with a master component according to some inventive principles of this patent disclosure.

FIG. 10 illustrates an embodiment of a control system with a master component according to some inventive principles of this patent disclosure. In an embodiment, a control system 110 can include input components 12, a communication link 16, and control components 18 as described in FIG. 1. However, the control system 110 can also include a master component 112. The master component 112 can be configured to have capabilities that are associated with the entire control system 110 or a subset of the control system 110.

For example, the master component 112 can be configured to maintain a schedule of operating mode changes. As described above, changes can occur in operating modes of input components 12 and control components 18 in response to events such as the opening or closing of an office. The master component 112 can be configured to determine when such a change will occur. In other words, the master component 112 can be configured with a schedule detailing the changes in operating modes.

In one example, the schedule can include a compilation of events that can result in an operating mode change for input components 12 and control components 18. For example, the schedule can define weekdays and weekends. When the master component 112 determines that a weekend has arrived, the master component 112 can transmit a schedule change signal indicating that operating modes should change to the weekend operating mode. Similarly, the master component 112 can transmit a schedule change signal indicating the transition to a weekday.

In addition to such time related schedule information, the schedule can include changes that occur based on particular events. For example, a schedule can define a generic week with weekdays and weekends. However, the schedule can also define an exception to such periods. For example, the schedule can define holidays, office closures, snow days, or any other event that may result in a change in operating mode. That is, using a holiday as an example, the schedule change signal can indicate that the weekend operating mode should be used on the holiday even if the holiday occurs on a weekday. Accordingly, a hierarchy of events can form part of a schedule and affect changes in operating modes.

Furthermore, the master component 112 can also be configured to maintain system-wide parameters. For example, the master component 112 can be configured to maintain a clock. In response to the clock, the master component 112 can transmit a current time signal, as described above. Thus, input components 12 and control components 18 can change operating modes as described above. However, in another embodiment, the clock can be an input component 12 that is configured to generate control information including a time signal.

That is, the schedule change signal indicating the change to operating mode two can be based on a daily schedule, weekly schedule, holiday schedule, or the like. The schedule need not be communicated to the input components 12 and control components 18. Moreover, the schedule change signal can also be generated in response to a user input, a command from an external source, such as an electric power supplier during a period of peak usage, or the like. Even though the master component 112 can exercise some central control, the operation of the input components 12 and control components 18 can still be defined by the configurations distributed to the input components 12 and control components 18.

Although references to time related messages, calendar related messages, or the like have been described above, a schedule change signal from the master component 112 need not reference a time, day, astronomical event, or the like. For example, the control components 18 can be configured with operating modes one, two, and three. The schedule change signal can instruct a change to operating mode two. The schedule change signal need not reference any underlying stimulus for the schedule change signal.

Figure 11:
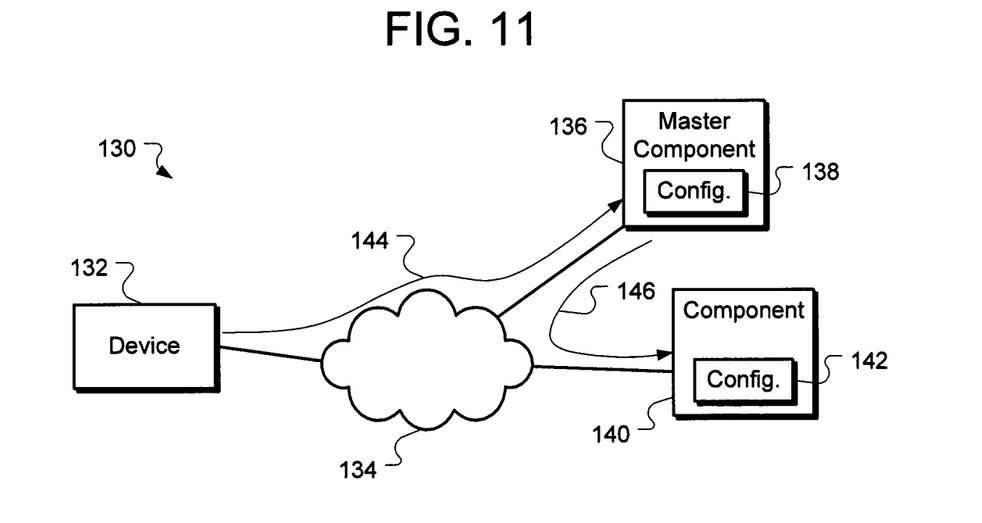
FIG. 11 illustrates an embodiment of a distribution of a configuration of a control system according to some inventive principles of this patent disclosure.

FIG. 11 illustrates an embodiment of a distribution of a configuration of a control system according to some inventive principles of this patent disclosure. In this embodiment, a control system 130 includes a communication link 134 coupling a master component 136 to another component 140, such as a control component or input component described above.

Figure 12:
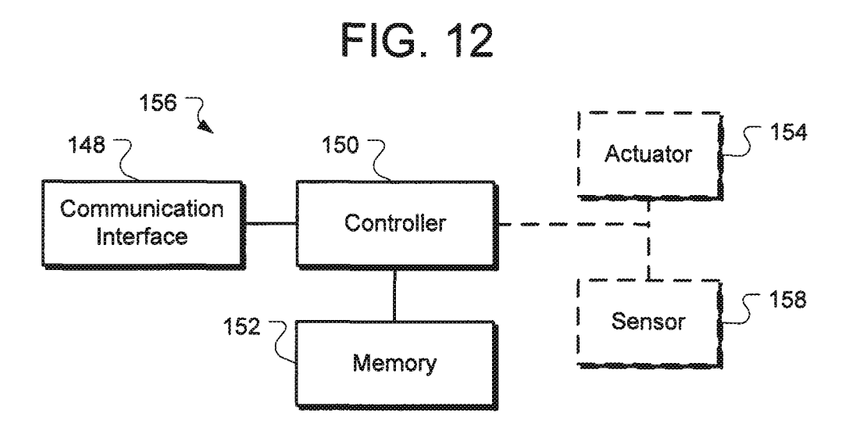
FIG. 12 illustrates an embodiment of a component of FIG. 11 according to some inventive principles of this patent disclosure.

FIG. 12 illustrates an embodiment of a component of FIG. 11 according to some inventive principles of this patent disclosure. The component 156 includes a controller 150 coupled to a communication interface 148 and a memory 152. The controller 150 and communication interface 148 can be similar to the controller 44 and communication interface 42 described above. Similarly, an actuator 154, if present, can be similar to the actuator 46 described above.

Referring to FIGS. 11 and 12, the master component 136 can be configured to store a configuration 138 in its memory 152. Similarly, the component 140 can be configured to store a configuration 142 in its memory 152. The configuration 138 stored in the master component can include configurations for each of the components of the control system 130, such as the configuration 142 of the component 140. In contrast, the configuration 142 stored in the component 140 may not have the configurations of other components of the control system 130; however, as described in further detail below, the configuration 142 may have configurations for other components of the control system 130.

A device 132 can also be coupled to the communication link 134. The device 132 can be configured to be part of the control system 130, can be configured to be temporarily coupled to the control system 130, or the like. Through the device 132 the control system can be configured. For example, the configuration 138 of the master component 136 can be installed, updated, modified, or the like by the device 132.

In an embodiment, the device 132 can be configured to transmit a configuration to the master component 136. For example, the device 132 can be configured to obtain a lock over the configuration 138 of the master component 136. The device 132 can be configured to transmit the configuration to the master component 136 represented by communication 144.

The configuration transmitted to the master component 136 can be any part to all of a configuration for the control system 110. For example, the transmitted configuration can include operating modes for control components 18, schedules for the master component 136, any other configuration information, a combination of such information, or the like.

The device 132 can be configured to release the lock after the configuration has been updated. At this point the master component 136 can be configured to update the configurations 142 of components 140. For example, communication 146 from the master component 136 to the component 140 can include only an updated configuration for that component 140. That is, the updated configuration can be transmitted to the component 140 without updated configurations for other components of the control system 130. However, as will be described in further detail below, other configuration information can be transmitted to component in addition to the configuration for that component.

Although the configuration 138 of the master component 136 has been described as updated, the updated configuration need not be only a change to an existing configuration. For example, an updated configuration can include a replacement configuration, a new configuration for a control system 110 that was not previously configured, or the like. In another example, a configuration of the master component 136 itself may not change, but the portion corresponding to the configuration 142 in the configuration 138 may change.

In an embodiment, the master component 136 can communicate to a component 140 using a version identification of the configuration 142. A version identification can include a version number, a time stamp, key, or any other information of combination of such information that can distinguish one configuration from another. The master component 136 can be configured to negotiate with other components 140 to determine if a corresponding portion of the configuration 138 stored in the master component 136 is different from the configuration 142 of the component 140. Accordingly, only changed configurations can be transmitted if desired.

Although the updating of a configuration 138 has been described using a device 132, the configuration communication can occur in the opposite direction. That is, the configuration 138 stored in the master component 146 can be transmitted to the device 132.

Figure 13:
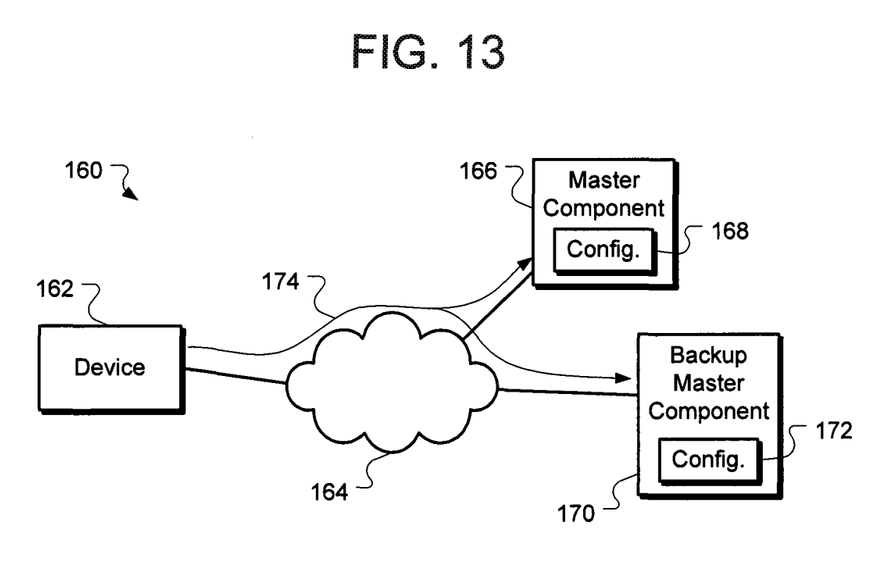
FIG. 13 illustrates another embodiment of a distribution of a configuration of a control system according to some inventive principles of this patent disclosure.

FIG. 13 illustrates another embodiment of a distribution of a configuration of a control system according to some inventive principles of this patent disclosure. In this embodiment, the control system 160 includes a communication link 164, a master component 166 with a configuration 168 and a backup master component 170 with a configuration 172. As described above, a device 162 can be coupled to the communication link 164 and update the configuration 168 of the master component 166.

In addition, in response to a single update message from the device 162 represented by communication 174, the configuration 172 in the backup master component 170 can also be updated. For example, the device 162 can be configured to transmit an update message using a broadcast or multi-cast address. Each of the master component 166 and the backup master component 170 can be configured to respond to communications using such broadcast or multicast addresses.

Although a single update message has been described, the entire updated configuration need not be transmitted in the single update message. That is, the updated configuration or partial configuration in the update message can be used to update each of the configurations 168 and 172 of the master component 166 and the backup master component 170. Subsequent updates in additional messages can be used to update the same or other portions of the configurations 168 and 172. However, the device 162 need not communicate to each of the master component 166 and the backup master component 170 individually.

Although one component has been designated as a master component 166 and another component has been designated as a backup master component 170, such designations can, but need not, be predetermined, fixed, or the like. For example, in an embodiment, the master component 166 can be the component that has a lowest network address on the communication link 164. In another example, a negotiation can be performed between the components capable of performing as a master component 166. In another example, the first of such components to respond can operate as a master component 166 while others can operate as backup master components 170.

Regardless of which component is a master component 166, the configurations 168 and 172 of the master component 166 and the backup master component 170 can be updated substantially simultaneously in response to the communication 174. Thus, multiple copies of the control system 160 configuration can be maintained, for example, in the event of a failure, maintenance of a master component 166, or the like.

As described above, the configuration 168 of a master component can be retrieved by a device 162. The determination of which component is a master component 166 can similarly be used to determine which component capable of being a master component 166 will transmit its configuration to the device 162. Again, even with an unavailability of a particular master component 166, a backup component 170 can operate as the master component 166 and communicate the control system 160 configuration to the device 162.

Figure 14:
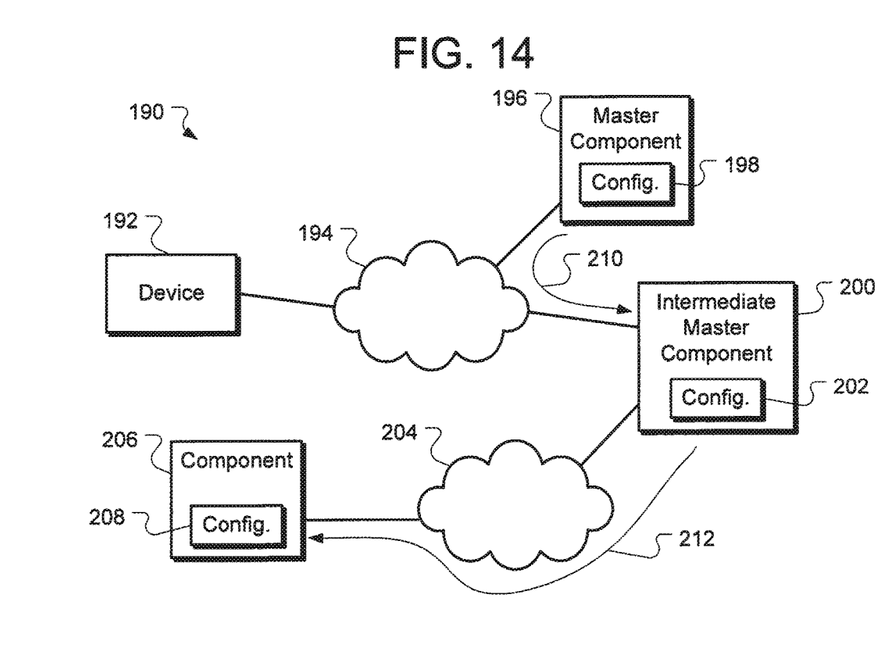
FIG. 14 illustrates another embodiment of a distribution of a configuration of a control system according to some inventive principles of this patent disclosure.

FIG. 14 illustrates another embodiment of a distribution of a configuration of a control system according to some inventive principles of this patent disclosure. In this embodiment, the control system 190 includes a first communication link 194 coupling a master component 196 and an intermediate component 200. A device 192 can be configured to be coupled to the first communication link 194 as described above and update a configuration 198 of the master component 196.

The intermediate component 200 can be coupled to a second communication link 204. Another component 206 with its own configuration 208 can be coupled to the second communication link 204. The intermediate component 200 can be coupled to bridge the first and second communication links 194 and 204.

The intermediate component 200 can be configured to store a configuration 202. The configuration 202 can include not only the configuration of the intermediate component 200, but also the configuration 208 of the component 206. The master component 196 can be configured to communicate such configurations to the intermediate component 200 represented by communication 210.

The intermediate component 200 can be configured to operate as a master component for components coupled to the second communication link 204. In particular, the intermediate component 200 can be configured to transmit an updated configuration 208 to the component 206 from its own configuration 202. Accordingly, the master component 198 can be relieved of the operation of updating components, such as component 206, coupled to different networks, different subnets, different busses, or the like.

Although the intermediate master component 200 has been described as including a subset of the configuration stored on a master component 196, the intermediate master component 200 could also be configured to operate as a master component, a backup master component, or the like as described above.

Figure 15:
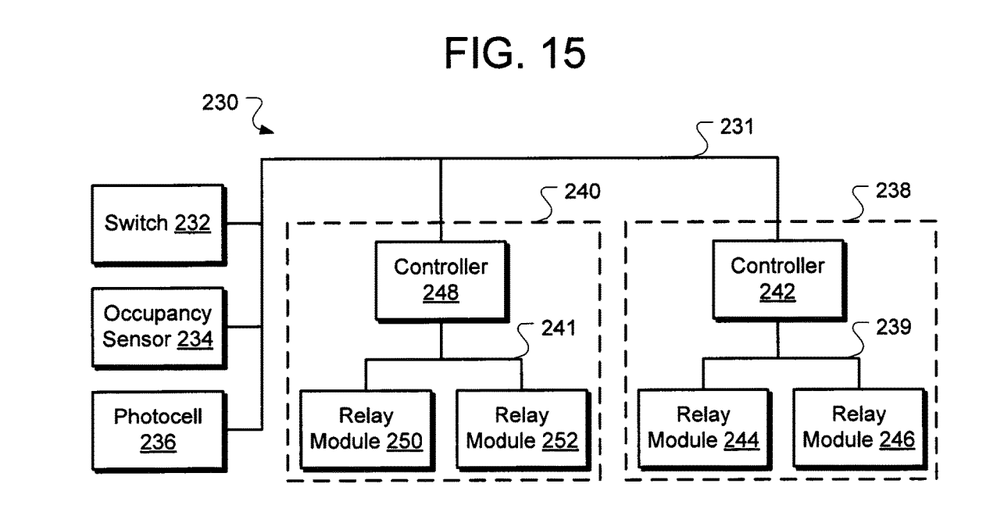
FIG. 15 illustrates an embodiment of a lighting control system according to some inventive principles of this patent disclosure.

FIG. 15 illustrates an embodiment of a lighting control system according to some inventive principles of this patent disclosure. In this embodiment, the lighting control system 230 includes a switch 232, an occupancy sensor 234, a photocell 236, and relay cabinets 238 and 240. These components are coupled to a controller area network (CAN) bus 231.

Relay cabinet 238 includes a controller 242, relay modules 244 and 246, and a multi-drop serial bus 239 coupling the controller 242, and relay modules 244 and 246 together. Similarly, relay cabinet 240 includes a controller 248, relay modules 250 and 252, and a multi-drop serial bus 241 coupling the controller 248, and relay modules 250 and 252 together. Although a particular number and a particular configuration of connections between components have been illustrated, there can be any number of components connected together as desired.

The switch 232, occupancy sensor 234, and photocell 236 can be input components as described above. The relay modules 244, 246, 250, and 252 can be control components as described above. One or more of the controllers 248 and 242 can act as master components, backup master components, intermediate master components, or the like as described above.

Accordingly, the switch 232, occupancy sensor 234, photocell 236, or the like can receive an input and, in response, transmit control information on the CAN bus 231. The control information can be received by the controllers 248 and 242, and transmitted to the relay modules 244, 246, 250, and 252. Each of the relay modules 244, 246, 250, and 252 can process the control information according to an identification in the control information as described above. Although a particular example of operation of the control system 230 has been given, the control system 230 can be operated, configured, or the like as described above.

Moreover, the inventive principles of this patent disclosure have been described above with reference to some specific example embodiments, but these embodiments can be modified in arrangement and detail without departing from the inventive concepts. Such changes and modifications are considered to fall within the scope of the following claims.

The invention claimed is:

1. A lighting control system, comprising:
a lighting system input component configured to receive an input and generate a message using an identification including control information in response to the input;
a communication link coupled to the input component to allow transmission of the message; and
a plurality of lighting system control components associated with the identification, each having at least one actuator, each of the plurality of the control components coupled to the input component through the communication link and each control component associated with the identification configured to receive the control information and to individually determine how to respond to the control information, wherein the input component transmits the message without configuration of control components associated with the identification and the control components respond to the message without being configured with the identification of any input components.

2. The control system of claim 1, the control components referred to as first control components, the control system further comprising:
at least one second control component coupled to the communication link.

3. The control system of claim 1, wherein each of the control components is configured to operate according to a selected operating mode of a plurality of operating modes.

4. The control system of claim 3, wherein each of the control components is configured to select the selected operating mode from among the operating modes in response to an associated schedule change signal.

5. The control system of claim 3, wherein each of the control components is configured to select the selected operating mode from among the operating modes in response to a single schedule change signal.

6. The control system of claim 3, wherein each of the control components is configured to transition to the selected operating mode from a deselected operating mode through a transition operating mode.

7. The control system of claim 1, wherein the input component is configured to operate according to a selected operating mode of a plurality of operating modes.

8. The control system of claim 7, wherein the input component is configured to select the selected operating mode from among the operating modes in response to an associated schedule change signal.

9. The control system of claim 7, wherein the input component is configured to transition to the selected operating mode from a deselected operating mode through a transition operating mode.

10. The control system of claim 1, wherein the identification identifies at least two of the control components.

11. The control system of claim 1, wherein the input component is configured to receive a message including the identification and update a status in response to the message.

12. The control system of claim 1, wherein for each control component:
the identification is different from an identification associated with the communication link of the control component; and
the control component is configured to actuate the associated actuator in response to the control information if the identification matches an identification associated with the control component.

13. The control system of claim 12, wherein for at least two control components of the control components the identifications associated with the control components of the at least two control components are substantially identical.

14. The control system of claim 12, wherein for each control component, the control component is configured to transmit a message including the identification.

15. The control system of claim 1, wherein:
the input component and a plurality of control components are associated with a group identification; and
further comprising a master component configured to receive a status from each of a control components associated with the group identification, and configured to transmit a group status to the input component.

* * * * *